(12) United States Patent
Ahr

(10) Patent No.: US 6,869,661 B1
(45) Date of Patent: Mar. 22, 2005

(54) FLEXIBLE RADIANT BARRIER

(76) Inventor: David D. Ahr, 13715 Cahill Ct., Cypress, TX (US) 77429

( * ) Notice: Subject to any disclaimer, the term of this patent is extended or adjusted under 35 U.S.C. 154(b) by 0 days.

(21) Appl. No.: 10/280,303

(22) Filed: Oct. 24, 2002

(51) Int. Cl.[7] .......................... B32B 15/14; B32B 3/10; E04B 5/00
(52) U.S. Cl. ..................... 428/137; 428/596; 428/608; 442/232; 442/233; 442/234; 442/235; 442/378; 52/408; 52/506.01
(58) Field of Search .............................. 428/137, 138, 428/148, 596, 605; 442/228–235, 376–380; 52/408, 506.01

(56) References Cited

U.S. PATENT DOCUMENTS

| | | | |
|---|---|---|---|
| 3,770,559 A | 11/1973 | Jackson | |
| 4,326,909 A | 4/1982 | Slavik | |
| 4,622,253 A | * 11/1986 | Levy | ............................ 428/91 |
| 4,745,032 A | 5/1988 | Morrison | |
| 5,096,759 A | 3/1992 | Simpson et al. | |
| 5,122,412 A | * 6/1992 | Jones et al. | .................. 442/376 |
| 5,227,230 A | * 7/1993 | McGlade | .................. 428/319.1 |
| 5,231,814 A | 8/1993 | Hageman | |
| 5,518,799 A | 5/1996 | Finestone et al. | |
| 5,660,924 A | * 8/1997 | Yamaji et al. | ............... 442/378 |
| 6,251,495 B1 | 6/2001 | Wilson et al. | |
| 6,286,280 B1 | 9/2001 | Fahmy et al. | |
| 6,536,176 B1 | * 3/2003 | Nordgren et al. | ......... 52/506.01 |
| 6,599,850 B1 | * 7/2003 | Heifetz | ......................... 442/376 |
| 2002/0160673 A1 | * 10/2002 | Zupon et al. | .................. 442/31 |
| 2004/0000112 A1 | * 1/2004 | Alderman | ................... 52/407.3 |

FOREIGN PATENT DOCUMENTS

WO    WO 01/058683 A1 *  8/2001

* cited by examiner

Primary Examiner—Harold Pyon
Assistant Examiner—Patricia L. Nordmeyer

(57) ABSTRACT

The present invention provides a flexible heat reflective radiant barrier that may be conveniently installed on a structure without the need to simultaneously replace rigid construction decking panels. The flexible heat reflective radiant barrier is for use as part of the outer-protective water-shedding materials of a structure or building, such as underneath shingles, tiles, or siding. At least one heat reflective layer is adhered to at least one layer of a felt roofing material. The flexible heat reflective radiant barrier may be disposed in rolls for case of storage and handling. The rolls are easily applied to rigid construction decking panel substrates, such as plywood or oriented strand board construction sheets of structural 2×4, 2×6 side walls or the like, as a part of the exterior water-shedding material.

6 Claims, 2 Drawing Sheets

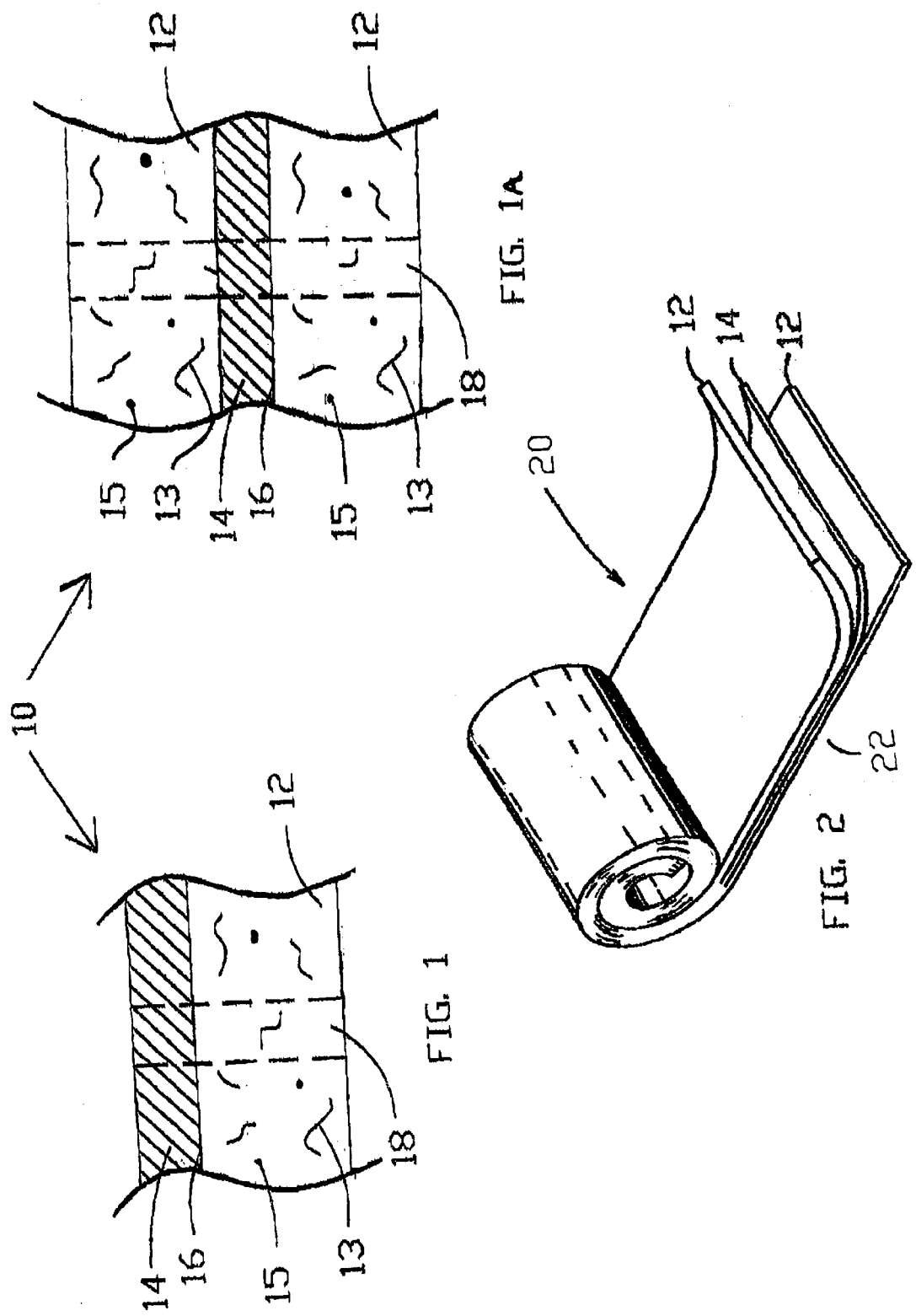

US 6,869,661 B1

FLEXIBLE RADIANT BARRIER

CROSS-REFERENCE TO RELATED APPLICATIONS

Not Applicable.

STATEMENT REGARDING FEDERALLY SPONSORED RESEARCH OR DEVELOPMENT

Not Applicable.

BACKGROUND OF THE INVENTION

1. Field of the Invention

The present invention relates generally to construction materials and more particularly to exterior, water-shedding construction materials that provides a flexible radiant barrier.

2. Description of the Related Art

Roofs and siding, which form the outer covering of a building or house, are subject to high temperatures in the summer that increase heat inside the house and significantly increase the costs of cooling the interior space. In many cases, a layer of insulation is provided on the floor of the attic. However, such insulation tends to be expensive, bulky, limited to the available attic or wall space, and may be ineffective in preventing the high temperatures that build up in the attic from radiating into the upper portions or sides of a, building or house. Moreover, such insulation is completely ineffective for lowering the attic temperatures, and may even cause the attic temperatures to increase by trapping the heat therein. Higher attic temperatures dramatically increase the likelihood of heat radiating into the house, while existing roof constructions tend to increase the temperature of houses in the summer, in the winter, the roofs are a significant source of heat loss.

Roofing construction for homes or buildings may generally be comprised of decking, which may include sheets of plywood, oriented strand board (OSB), and the like, which are nailed or otherwise fastened to structural members such as rafters and beams that define the roof of the structure. The decking forms a substrate onto which water-shedding materials, such as tar paper, also called felt, shingles, slate and metal, may be added to complete the roof.

The above-described roofing structure in itself provides inadequate insulation. Insulative materials have been provided to the exterior and interior sides of the decking, such as polystyrene boards with insulating materials mounted thereon, but installation of such materials increases construction cost and the materials themselves tend to be expensive and bulky to handle. As described in the below-listed patents, oriented strand board decking itself has been insulated by various means. Heat reflective layers have been provided with oriented strand board decking, however, this type of material tends to be expensive to manufacture. Moreover, when replacing roofs, in order to install oriented strand board having heat reflective materials thereon, it is necessary to first replace the entire non-insulated decking in order to obtain the benefits of insulated decking, thereby greatly increasing the cost of roof replacement.

The following patents address the above discussed problems:

U.S. Pat. No. 4,326,909, issued Apr. 27, 1982, to Raymond F. Slavik, discloses an insulation material having relatively high moisture permeability, which includes an inner sheet of expanded polystyrene of substantial thickness, with an attached layer of impermeable krafl aluminum foil outer layer, having the paper side facing the polystyrene. Perforations are formed in the outer layer, preferably with a roller having a inner cylinder, an outer shell covering the cylinder with a plurality of holes therein corresponding to a predetermined pattern, and tacks having a pointed end or spike and a head end for the forming of perforations.

U.S. Pat. No. 5,231,814, issued Aug. 3, 1993, to Robert Hageman, discloses a decking and sheathing material for roofing, which includes a rigid sheet of plywood or oriented strand board with a reflective layer of foil material adhered thereto. The roof decking is deployed atop rafters in a typical roof structure, with the reflective surface facing inward and exposed to the interior of the structure. A machine for applying the foil material to sheets of plywood includes a conveyer belt table for conveying plywood sheets in succession, an adhesive roller for uniformly applying a layer of adhesive to a surface of each plywood sheet and a roller for pressing the foil material onto the adhesive-coated surface from a supply roll.

U.S. Pat. No. 6,251,495, issued Jun. 26, 2001, to Wilson et al., discloses a product, and method for production, comprised of a radiant barrier material adhered to a rigid substrate, which enables trapped excess moisture to be transported from the product to the surrounding atmosphere while maintaining its effective radiant barrier properties. A plurality of apertures, which extend substantially completely through both the radiant barrier material and the adhesive material, are formed so as to maintain the surface area of the radiant barrier.

U.S. Pat. No. 6,286,280, issued Sep. 11, 2001, to Fahmy et al., discloses a flame retardant composite sheathing including a core layer, having a plurality of superposed layers of a water-resistant paperboard adhered together by layers of an adhesive positioned intermediate and contacting adjacent said layers of water-resistant paperboard, a first layer of a polyolefin adhered to a major or surface of the core layer, a metal foil adhered to the first layer of polyolefin, a second layer of a polyolefin adhered to the metal foil, and a layer of water resistant liner board adhered to the second layer of polyolefin.

U.S. Pat. No. 5,518,799, issued May 21, 1996, to Finestone et al., discloses a high-strength, breathable paper-plastic laminate sheeting useable as a protective barrier in the structures of homes and buildings. The laminate sheeting is composed of a paper ply cold-laminated by a water-based adhesive to a reinforcing ply formed by an oriented synthetic plastic film, such as polypropylene, that imparts exceptional tear and burst strength to the laminate sheeting, at least one surface of the film being corona-discharge treated to render it wettable and receptive to adhesives. The sheeting is foraminated throughout its entire surface to create a myriad of fine pores that render the sheeting permeable to moisture vapor, but effectively impermeable to liquids. For some applications, an additional paper ply, which may be a metalized paper, is cold-laminated to the other side of the film ply, and/or an additional film ply is cold-laminated to the other side of the paper ply.

U.S. Pat. No. 5,096,759, issued Mar. 17, 1992, to Simpson et al., discloses a laminated roofing material comprised of an aluminum foil top sheet laminated to a polyethylene film by an ionomer resin. After the sheets are bonded together, they are cooled to set the resin and a bitumen coating is applied to the exposed polyethylene sheet and covered with a release paper. The roofing material is applied over an underlayment to form a roof supported by conventional sheeting material.

U.S. Pat. No. 3,770,559, issued Nov. 6, 1973, to Barry Sidney Jackson, discloses a waterproof, pressure sensitive adhesive laminate in which a flexible plastics backing sheet is coated with a bituminous adhesive composition containing a minor proportion of rubber or thermoplastic polymer. The backing sheet is reinforced with a fabric, which is embedded in the sheet and provides substantial resistance to stretching.

U.S. Pat. No. 4,745,032, issued May 17, 1988, to B. J. Morrison, discloses an article of construction comprising a substrate coated with a multi-ply coating including an acrylic resin coating adhered to the surface of said substrate and underlying and adhered to an overlying acrylic resin coating, the acrylic resin of said underlying coating being a different acrylic resin than that of said underlying coating, the adhesive bond between said overlying and underlying coatings being stronger than if the bond were between two coatings formed from the same acrylic resin. Additionally disclosed are embodiments in which combusted coal residue is included in either the underlying or the overlying coating.

It would be an improvement to the prior art to provide an inexpensive, easily installed radiant barrier that may be utilized on new roofs, as well as reconstruction, and for other various construction purposes.

BRIEF SUMMARY OF THE INVENTION

Accordingly, the objects of my invention is to provide, inter alia, a flexible heat reflective radiant barrier system that:

may be handled in a similar fashion to conventional roofing materials;

may be rolled into a compact form for ease of storage, transport and deployment;

may be installed without any increase in labor costs; and is installable without replacing rigid panels that form the roof or walls.

These and other objectives, features, and advantages of the present invention will become apparent from the drawings, the descriptions given herein, and the appended-claims. However, it will be understood that the above-listed objectives of the invention are intended only as an aid in understanding aspects of the invention, and are not intended to limit the invention in any way, and therefore do not form a comprehensive or restrictive list of objectives, and/or features, and/or advantages of the invention.

My invention is a flexible heat reflective radiant barrier system integrated into the outer protective water-shedding materials of a building or house. The rollable flexible heat reflective radiant barrier roofing construction material may comprise one or more layers of heat reflective foil and at least one layer of flexible, outer protective, water-shedding roofing felt material, such that the heat reflective foil is secured to the flexible roofing felt material, whereby the foil layer and the felt are simultaneously attached to the building or house.

The composition of the flexible roofing material may vary, being comprised of one or more materials from a group consisting of polyester fibers, polymers glass fibers, nylon, acrylic fibers, polypropylene fibers, plastic fibers and cotton fibers.

A typical felt layer ranges in thickness from about two millimeters to about eight millimeters, and can be arranged into a cylinder, wrapped upon itself, to simplify handling. The height and width dimensions of the foil layer are substantially equal to the dimensions of the flexible roofing material. In some applications the radiant barrier should not trap moisture. In such cases a plurality of apertures are provided to allow limited moisture communication.

A method of making a flexible heat reflective radiant barrier roofing construction material for integration into the outer protective water-shedding materials of a building or house is comprised of one or more steps, such as, providing a heat reflective foil layer; providing a flexible layer of roofing felt of substantially similar size to the foil layer; combining the heat reflective foil layer with the flexible layer of roofing felt whereby the heat reflective foil layer and the flexible layer of roofing felt may be applied simultaneously to the roof decking or wall substrate of a building or house.

In an alternate embodiment, the method may comprise combining two felt layers with the heat reflective foil layer situated between the flexible layers of roofing felts.

An alternate embodiment of the method for providing a radiant barrier in a building or house is comprised of mounting a flexible heat reflective radiant barrier roofing material to the existing rigid construction decking material substrate, whereby the layer of flexible heat reflective radiant barrier roofing material may comprise a layer of foil and roofing felt, with the final outside covering to the building or house over the flexible heat reflective radiant barrier roofing material.

The installation method may further comprise nailing the flexible heat reflective radiant barrier roofing material to the rigid construction material substrate. The step of mounting an outside covering may further comprise mounting shingles onto the flexible heat reflective radiant barrier roofing material. An alternate installation method also includes the step of mounting the combined flexible heat reflective radiant barrier, with both the reflective layer and the flexible roofing material layer, to the structure as a single unit, thereby save on labor costs. The method may also include the step of mounting the flexible heat reflective radiant barrier material to the outside of a building or house further comprises mounting a final outer shingle or siding material of any type to the building or house.

BRIEF DESCRIPTION OF THE DRAWINGS

For a further understanding of the nature and objects of the present invention the following detailed description can be taken in conjunction with the accompanying drawings. Like elements may be given the same or analogous reference numbers.

FIG. 1 is a cross-sectional elevation view, of a flexible heat reflective radiant barrier material in accordance with the present invention.

FIG. 1a is a cross-sectional elevation view of a flexible heat reflective radiant barrier material with multiple layers of felt material.

FIG. 2 is a side elevation view of a roll of the flexible heat radiant barrier material of FIG. 1.

FIG. 3 is a side elevation view, partially in cross-section, of a presently preferred installation of the flexible heat reflective radiant barrier material of FIG. 1 and/or FIG. 1a.

DESCRIPTION OF THE INVENTION

Figure 3:
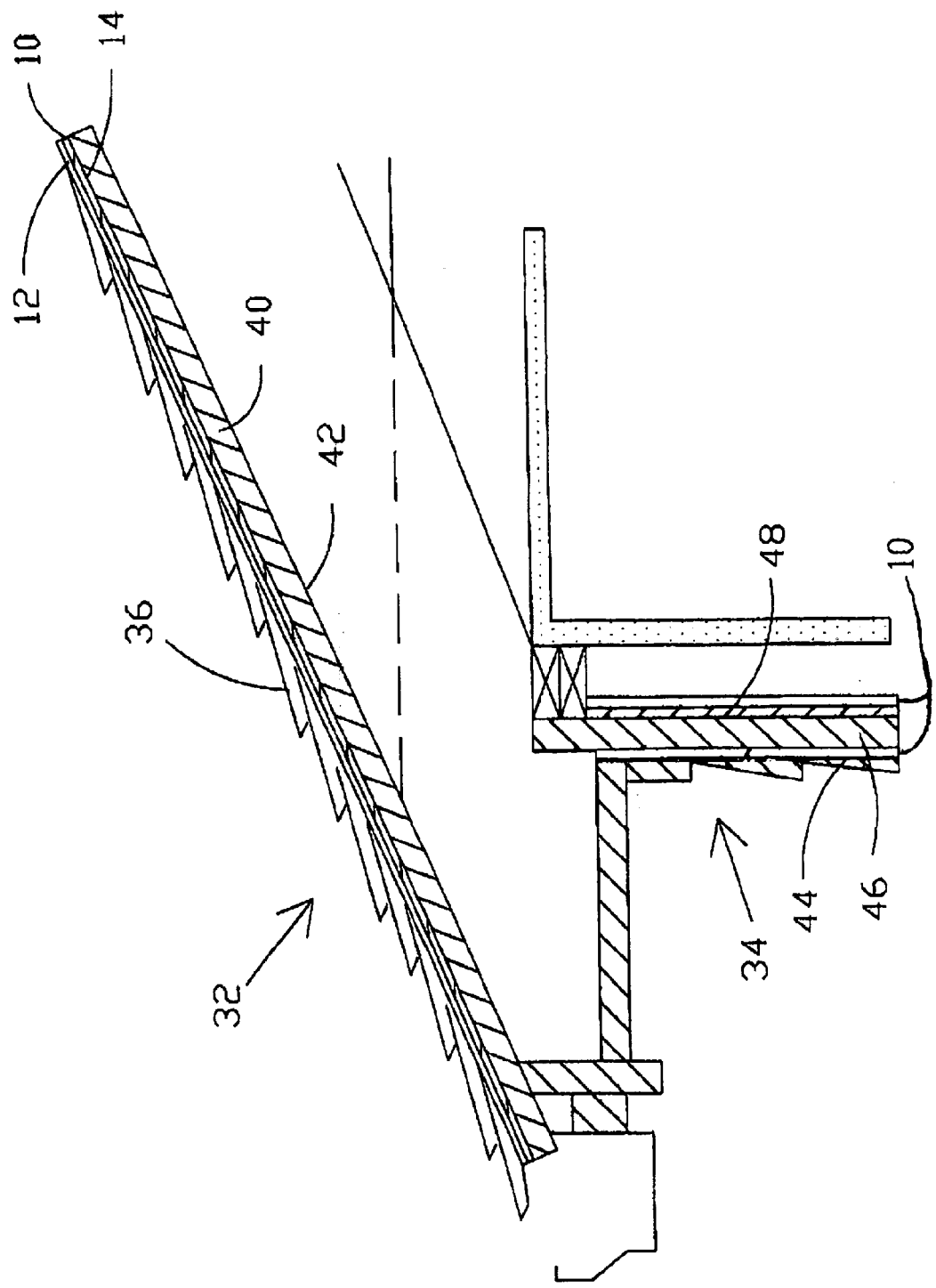

Now referring to the drawings, and more particularly to FIG. 1, there is shown an exemplary embodiment of flexible radiant barrier 10 in accord with the present invention. Flexible material 12 is a flexible material suitable as an outer protective water-shedding material for roofing, such as existing roofing felts. Felt, as used herein, refers to non-woven material, which may be arranged into rolls.

Felt may be comprised entirely of one product, such as polyester fibers, or may comprise numerous materials. Approximately seventy to ninety percent of the felt may be polyester. Polyester is a very suitable material for roofing applications due to the strength, tear resistance, and puncture resistance. Various types of other materials may be utilized including fibers 13 such as fiberglass, glass fibers, recycled paper, nylon threading and polyethylene. Materials 15 may also be included as desired, such as polymers, fillers, bitumen, tar, other oil related or refined products.

A typical thickness of flexible material 12 use in the field ranges from about 2 mm to about 10 mm, and is flexible enough to be rolled into a cylinder. Alternate exemplary embodiments of flexible material 12 utilize a talc or mineral surface finish and comprise various underlays such as glass fiber underlays. Additional alternate exemplary embodiments of flexible material 12 comprise rubbers, plastics, elastomers, elastomerics, hydrocarbon based materials, or synthetic materials. Other materials such as fabrics soaked with bitumen may be utilized for some types of applications.

Radiant or heat reflective barrier material 14 comprises of material with high heat reflection capability such as a foil. In the exemplary embodiment heat reflective barrier 14 is a metallic foil, such as aluminum foil. The reflective barrier material 14 is selected for its ability to block or reflect heat and may be of any suitable material that is both flexible and is also suitable to blocking or reflecting heat.

Reflective barrier material 14 may be glued with adhesives, epoxies, or otherwise attached by heating, rolling, pressing, indentations, fasteners, or the like, to flexible material 12 at interface 16. In an alternate exemplary embodiment (not shown), multiple layers of reflective barrier material 14 may be utilized. Multiple layers may be sandwiched between layers of flexible material 12. Thus, one or more layers of reflective barrier material 14 may be utilized with one or more layers of flexible material 12.

Flexible radiant barrier 10 has at least one layer of reflective barrier material 14. In an exemplary embodiment, a single foil type layer to form a reflective barrier material 14 is adhered to a flexible material 12 of roof felt comprised primarily of polyester. In alternate embodiments, multiple layers of varying materials may be used in combination, to form reflective barrier material 14.

If desired, depending on the particular application for which flexible radiant barrier 10 is utilized, apertures 18 may be formed through reflective barrier material 14, to wick moisture through the flexible heat reflective radiant barrier 10. In the exemplary embodiment, small apertures 18 are spaced over the entire surface of flexible heat reflective radiant barrier 10. The size of apertures 18 is kept to a small size in order to permit the release of moisture from plywood wood, oriented strand board, particleboard, or other construction decking products onto which the flexible reflective radiant barrier 10 may be deployed, while maintaining the usefulness of reflective radiant barrier 10 as a protective water-shedding material.

In applications where flexible radiant barrier 10 is utilized as a primary weatherproofing seal, such as beneath shingles or shakes in particular roofing or siding application, it may not be desirable to utilize apertures 18. However, for other purposes, such as use in walls or as an interior layer for an attic, then apertures 18 may be desirable in order to prevent the accumulation of moisture behind radiant barrier 10. A flexible material 12 made of a more structurally integrated material is used when apertures 18 are desired.

FIG. 2 shows a side view of roll 20 of flexible heat reflective radiant barrier 10 in accord with the present inventions. In the exemplary embodiment, roll 20 of flexible heat reflective radiant barrier 10 is constructed to match the dimensions of standard roofing materials. For example, the field of roofing materials has prior art roofing felt rolled in the range of one yard wide and fifty yards long.

Alternate exemplary roll 20 comprises multiple layers 22 of flexible heat reflective radiant barrier 10 rolled in a continuous manner, similarly to conventional roofing or siding felt.

Installation is essentially the same as with prior art roofing felt and therefore requires no added labor costs than would normally apply. Thus, the present invention provides the significant benefits of reducing energy costs without additional installation labor costs as compared to normal roof or siding replacement costs.

Generally, the width and length of reflective barrier material 14 will be the same or approximately the same as width and length of flexible material 12. In some cases, it may be desirable to provide small margins or edges without the aluminum foil that may be used for overlap purposes of the like but the dimensions in such cases will still be substantially the same.

FIG. 3 shows representative uses of a flexible heat reflective radiant barrier 10 in construction for either roof construction 32 or wall construction 34. For roof construction 32, various types of materials, such as shingles, shakes or metal 36 may be mounted to form the final outer surface of roof construction 32. In an exemplary embodiment, flexible heat reflective radiant barrier 10 is mounted between shingles 36 and construction decking layer 40 substrate, as part of the outer protective water-shedding materials. Construction decking layer 40 substrate is typically comprised of decking sheets such as 4-foot by 8-foot plywood or oriented strand board. Rafters, crossbeams, and the like usually support this decking material of plywood or oriented strand board layer 40.

In an alternate exemplary embodiment of the installation method, flexible heat reflective radiant barrier 10 is secured to the outside substrate of plywood or oriented strand board layer 40 as indicated in FIG. 3, with the radiant heat reflective material 14 facing the decking. This permits flexible material 12 to be marked with alignment lines for installation of a final exterior surface and orients the reflective barrier material 14 as an outer protective water-shedding barrier. Additionally, on wet days, the reflective barrier material 14 side may become slick. Applying the reflective barrier material 14 side against the construction decking reduces a potential safety hazard. In an alternate embodiment, flexible heat reflective barrier 10 is comprised of two layers of flexible material 12 with an interior layer of reflective barrier material 14. This configuration eliminates the issue of slipperiness during installation.

Flexible heat reflective radiant barrier 10 is installable in place of prior art roofing felt, as part of the outer protective water-shedding system. For the same labor costs as would normally be required to install roofing felt, the significant advantages of providing a heat reflective radiant barrier may also be obtained and installed on the building or house. Flexible radiant barrier 10 is appropriate for use on wall 34 construction substrates. Flexible barrier 10 mounts between siding 44 and board or insulation material 46. Flexible heat reflective radiant barrier 10 is also mountable on an interior surface 48.

Thus, flexible heat reflective radiant barrier 10 is conveniently installable when the outer layer of a building or house, such as shingles 36 or siding 44, is replaced for maintenance purposes. For example, if shingles 36 are to be removed and replaced, then the roofing felt below the shingles will also be replaced. Flexible heat reflective radiant barrier 10 is installable instead of prior art roof felt or over existing felt, to simultaneously provide the protective water-shedding and the benefits of reduced heating and/or cooling requirements due to reduced radiant heat invading the interior spaces of a building or house. Likewise, if siding 34 is replaced, flexible heat reflective radiant barrier 10 is installable under the replacement exterior.

The foregoing disclosure and description of the invention is illustrative and explanatory thereof. Various changes in the details of the illustrated construction may be made within the scope of the appended claims without departing from the spirit of the invention. The present invention should only be limited by the following claims and their legal equivalents.

What is claimed is:

1. A flexible heat reflective radiant barrier for use as part of an outer surface of a structure, said barrier comprising:
    at least one reflective barrier material layer, wherein the barrier material is a metallic foil;
    at least one flexible felt material layer;
    a plurality of apertures through at least one of said reflective barrier material layers;
    a plurality of apertures through at least one of said flexible material layers;
    said at least one reflective material layer is secured to at least one of said flexible felt material layers, by adhesives, epoxies, fasteners or indentions;
    wherein said flexible heat reflective radiant barrier is secured to the outer surface of a structure by nails, brads, screws or staples;
    and wherein said flexible heat reflective radiant barrier is covered and in contact with a final exterior surface of shingles, stucco or siding.

2. The barrier of claim 1, wherein:
    said heat reflective radiant barrier is configured into rolls for storage or transport.

3. The method of providing a structure, having an exterior decking layer, with a flexible heat reflective radiant barrier, said method comprising:
    at least one reflective barrier material layer, wherein the barrier material is a metallic foil;
    at least one flexible felt material layer;
    a plurality of apertures through at least one of said reflective barrier material layers;
    a plurality of apertures through at least one of said flexible material layers;
    securing at least one reflective barrier material layer, together with at least one flexible felt material by heating, rolling, pressing, fastening with fasteners or gluing with adhesives or epoxies to form a flexible heat reflective radiant barrier;
    securing the flexible heat reflective radiant barrier to said exterior deck layer by nails, brads, screws or staples;
    and installing a final exterior surface of shingles, stucco or siding over and in contact with said heat reflective barrier.

4. The method of claim 3, wherein:
    said heat reflective radiant barrier is oriented with a said reflective barrier material layer proximate said exterior decking layer.

5. The method of claim 3, wherein:
    said heat reflective radiant barrier is oriented with a said flexible felt material layer proximate said rigid construction decking.

6. The barrier of claim 1 wherein the metallic foil is an aluminum foil product.

* * * * *